United States Patent
Flast et al.

(10) Patent No.: US 11,134,524 B2
(45) Date of Patent: Sep. 28, 2021

(54) METHOD AND SYSTEM FOR GESTURE-BASED CONFIRMATION OF ELECTRONIC TRANSACTIONS

(71) Applicant: MasterCard International Incorporated, Purchase, NY (US)

(72) Inventors: Benjamin Alexander Flast, New York, NY (US); Brien Buckman, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1256 days.

(21) Appl. No.: 15/218,498

(22) Filed: Jul. 25, 2016

(65) Prior Publication Data

US 2018/0025335 A1 Jan. 25, 2018

(51) Int. Cl.

| | |
|---|---|
| *G06F 3/01* | (2006.01) |
| *H04W 76/10* | (2018.01) |
| *H04W 4/029* | (2018.01) |
| *G06F 1/16* | (2006.01) |
| *G06Q 20/32* | (2012.01) |
| *G06Q 20/38* | (2012.01) |
| *G06Q 20/40* | (2012.01) |
| *G06Q 20/20* | (2012.01) |

(52) U.S. Cl.
CPC ............ *H04W 76/10* (2018.02); *G06F 1/163* (2013.01); *G06F 1/1626* (2013.01); *G06F 1/1698* (2013.01); *G06F 3/017* (2013.01); *G06Q 20/206* (2013.01); *G06Q 20/3223* (2013.01); *G06Q 20/388* (2013.01); *G06Q 20/401* (2013.01); *H04W 4/029* (2018.02)

(58) Field of Classification Search
CPC ...... G06F 3/017; G06F 3/04833; G06F 1/163; H04W 76/10; H04W 4/029; G06Q 30/0641
See application file for complete search history.

(56) References Cited

U.S. PATENT DOCUMENTS

| | | | |
|---|---|---|---|
| 9,773,245 B1* | 9/2017 | Patel | G06F 21/32 |
| 9,842,250 B2* | 12/2017 | MacDonald | G06F 21/32 |
| 2010/0217685 A1* | 8/2010 | Melcher | G06F 3/017 |
| | | | 705/26.1 |

(Continued)

*Primary Examiner* — Namrata Boveja
*Assistant Examiner* — Carol A See
(74) *Attorney, Agent, or Firm* — Buchanan Ingersoll & Rooney PC

(57) ABSTRACT

A method for electronically transmitting data based on a physical gesture includes: storing at least one gesture pair, wherein each gesture pair includes at least a physical gesture and an associated data conveyance, the physical gesture being stored as one or more data points telegraphing three-dimensional movement; capturing a plurality of movement data points based on movement of one or more motion capturing devices; identifying a specific gesture pair where at least one of the captured plurality of movement data points corresponds to the included physical gesture; establishing a communication channel with an external computing device; and transmitting the associated data conveyance included in the identified specific gesture pair to the external computing device using the established communication channel.

16 Claims, 8 Drawing Sheets

(56) References Cited

U.S. PATENT DOCUMENTS

| | | | |
|---|---|---|---|
| 2012/0198353 A1* | 8/2012 | Lee | G06F 3/017 |
| | | | 715/748 |
| 2015/0127541 A1* | 5/2015 | Just | G06Q 20/40 |
| | | | 705/44 |
| 2015/0379619 A1* | 12/2015 | Verde | G06F 3/0488 |
| | | | 705/27.1 |
| 2017/0083101 A1* | 3/2017 | Dow | G06F 1/163 |

* cited by examiner

METHOD AND SYSTEM FOR GESTURE-BASED CONFIRMATION OF ELECTRONIC TRANSACTIONS

FIELD

The present disclosure relates to the transmission of data based on a physical gesture, specifically the initiation of conveyance of payment details for use in an electronic payment transaction as a result of the performance of a predetermined physical gesture using a mobile computing device.

BACKGROUND

Consumers often use payment cards and other similar payment instruments to convey payment details in a payment transaction for many different reasons. Some consumers use them for flexibility in repayment, some use them for associated reward and loyalty programs, and some consumers use them for the security benefits over using traditional paper currency. In many cases, consumers may also elect to use such a payment method for the added convenience, as conveying payment details using a payment card often requires no more than a simple swipe or a tap by the consumer.

However, there are many instances where the use of a physical payment card may be inconvenient or pose a threat to the security of the payment card and the payment details encoded therein. For example, at sporting events, concerts, plays, and other similar events, vendors will often travel up and down the aisles between rows of seats and offer goods to attendees. If the attendee wants to make a purchase and there are other attendees between themselves and the aisle where the vendor is located, the purchaser must often rely on the other attendees to pass their payment card to the vendor and to pass their payment card, and purchase goods, back to them once the vendor has read their payment card. In such an instance, the purchaser must trust the other attendees, each of whom may compromise the payment card and corresponding transaction account.

Thus, there is a need for a technical solution to enable a consumer to convey payment details to merchant or employee associated therewith that can be accomplished without the physical exchange of a payment instrument. In such an instance, a consumer may be able to convey their payment details for use in a payment transaction with less opportunity for their payment details to be compromised, which may increase both convenience and security for consumers.

SUMMARY

The present disclosure provides a description of systems and methods for electronically transmitting data based on a physical gesture.

A method for electronically transmitting data based on a physical gesture includes: storing, in a memory of a mobile computing device, at least one gesture pair, wherein each gesture pair is a structured data set including at least a physical gesture and an associated data conveyance, the physical gesture being stored as one or more data points telegraphing three-dimensional movement; capturing, by one or more motion capturing devices, a plurality of movement data points based on movement of the one or more motion capturing devices; executing, by a querying module of the mobile computing device, a query on the memory of the mobile computing device to identify a specific gesture pair where at least one of the captured plurality of movement data points corresponds to the included physical gesture; establishing, by a transmitting device of the mobile computing device, a communication channel with an external computing device; and electronically transmitting, by the transmitting device of the mobile computing device, a data signal superimposed with the associated data conveyance included in the identified specific gesture pair to the external computing device using the established communication channel.

Another method for electronically transmitting data based on a physical gesture includes: storing, in a memory of a mobile computing device, at least one gesture data entry, wherein each gesture data entry is a structured data set including at least a gesture identifier and an associated data conveyance; storing, in a memory of a wearable computing device, at least one gesture pair, wherein each gesture pair is a structured data set including at least a physical gesture and an associated gesture identifier, the physical gesture being stored as one or more data points telegraphing three-dimensional movement; capturing, by one or more motion capturing devices of the wearable computing device, a plurality of movement data points based on movement of the wearable computing device; executing, by a querying module of the wearable computing device, a query on the memory of the wearable computing device to identify a specific gesture pair where at least one of the captured plurality of movement data points corresponds to the included physical gesture; electronically transmitting, by a transmitting device of the wearable computing device, the associated gesture identifier included in the identified specific gesture pair to a receiving device of the mobile computing device using a first communication channel; executing, by a querying module of the mobile computing device, a query on the memory of the mobile computing device to identify a specific gesture data entry where the included gesture identifier corresponds to the associated gesture identifier received from the wearable computing device; establishing, by a transmitting device of the mobile computing device, a second communication channel with an external computing device; and electronically transmitting, by the transmitting device of the mobile computing device, a data signal superimposed with the associated data conveyance included in the identified specific gesture data entry to the external computing device using the second communication channel.

A system for electronically transmitting data based on a physical gesture includes: a memory of a mobile computing device configured to store at least one gesture pair, wherein each gesture pair is a structured data set including at least a physical gesture and an associated data conveyance, the physical gesture being stored as one or more data points telegraphing three-dimensional movement; one or more motion capturing devices configured to capture a plurality of movement data points based on movement of the one or more motion capturing devices; a querying module of the mobile computing device configured to execute a query on the memory of the mobile computing device to identify a specific gesture pair where at least one of the captured plurality of movement data points corresponds to the included physical gesture; and a transmitting device of the mobile computing device configured to establish a communication channel with an external computing device, and electronically transmit a data signal superimposed with the associated data conveyance included in the identified specific gesture pair to the external computing device using the established communication channel.

Another system for electronically transmitting data based on a physical gesture includes: a memory of a mobile computing device configured to store at least one gesture data entry, wherein each gesture data entry is a structured data set including at least a gesture identifier and an associated data conveyance; a memory of a wearable computing device configured to store at least one gesture pair, wherein each gesture pair is a structured data set including at least a physical gesture and an associated gesture identifier, the physical gesture being stored as one or more data points telegraphing three-dimensional movement; one or more motion capturing devices of the wearable computing device configured to capture a plurality of movement data points based on movement of the wearable computing device; a querying module of the wearable computing device configured to execute a query on the memory of the wearable computing device to identify a specific gesture pair where at least one of the captured plurality of movement data points corresponds to the included physical gesture; a transmitting device of the wearable computing device configured to electronically transmit the associated gesture identifier included in the identified specific gesture pair to a receiving device of the mobile computing device using a first communication channel; a querying module of the mobile computing device configured to execute a query on the memory of the mobile computing device to identify a specific gesture data entry where the included gesture identifier corresponds to the associated gesture identifier received from the wearable computing device; and a transmitting device of the mobile computing device configured to establish a second communication channel with an external computing device, and electronically transmit a data signal superimposed with the associated data conveyance included in the identified specific gesture data entry to the external computing device using the second communication channel.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, event venue and the like, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Gesture-Based Conveyance of Data

Figure 1:
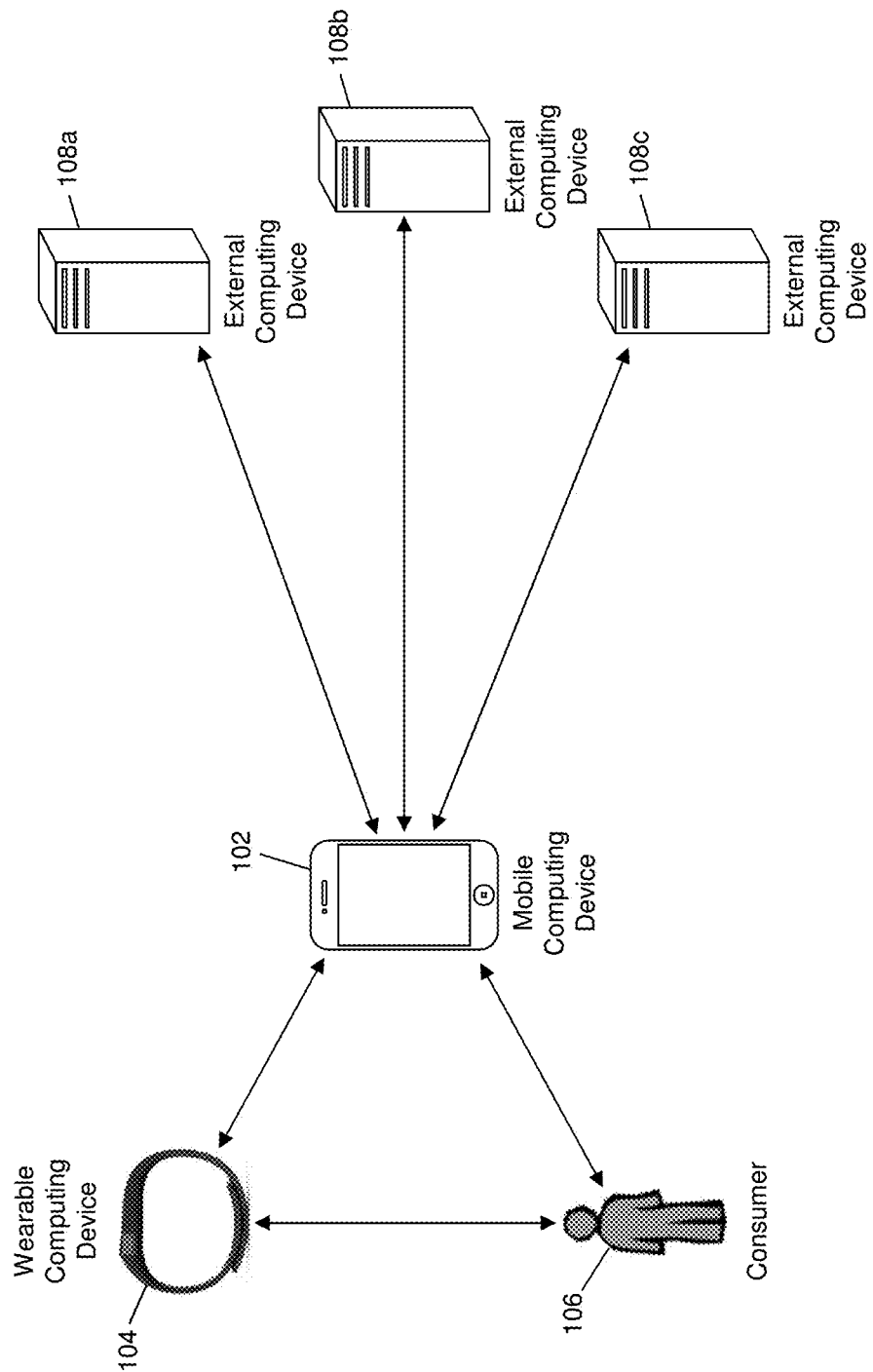
FIG. 1 is a block diagram illustrating a high level system architecture for electronically transmitting payment credentials using a physical gesture in accordance with exemplary embodiments.

FIG. 1 illustrates a system 100 for the conveyance of data from a mobile computing device based on performance of a physical gesture, where the conveyed data may include payment credentials for use in an electronic payment transaction.

The system 100 may include a mobile computing device 102. The mobile computing device 102, discussed in more detail below, may be configured to electronically transmit data based on the performance of a physical gesture. The mobile computing device 102 may be any suitable type of mobile computing device suitable for performing the functions discussed herein. For example, the mobile computing device 102 may be a cellular phone, smart phone, laptop computer, tablet computer, wearable computing device, implantable computing device, etc.

In some embodiments, the data being conveyed by the mobile computing device 102 may include payment credentials. Payment credentials may include data associated with a transaction account that may be suitable for use by a merchant in a payment transaction for funding of the payment transaction by the associated transaction account. Payment credentials may include, for example, a primary account number, transaction counter, payment cryptogram, and any other suitable data. Payment credentials may be provisioned to the mobile computing device 102 from an issuing financial institution or other entity associated therewith that is associated with the corresponding transaction account. Methods suitable for the provisioning of payment credentials to a mobile computing device 102 will be apparent to persons having skill in the relevant art.

In some embodiments, the mobile computing device 102 may be configured to capture a plurality of movement data points based on movement of one or more motion capturing devices. In such an embodiment, the one or more motion capturing devices may be part of the hardware of the mobile computing device 102, where the movement of the motion capturing devices may include movement of the mobile computing device 102 and may be captured thereby. The movement data points may include any measurement of movement suitable for the identification of a gesture, including direction, velocity, rotation, etc. In some instances, each motion capture device may be configured to measure a specific type of movement, such as a first motion capture device capturing movement direction and velocity on an x-axis, a second motion capture device capturing movement direction and velocity on a y-axis, a third motion capture device capturing movement direction and velocity on a z-axis, a fourth motion capture device capturing rotational direction and velocity of the mobile computing device 102, etc.

In some embodiments, the system 100 may include a wearable computing device 104. The wearable computing device 104 may be a mobile computing device configured to capture a plurality of movement data points based on movement of one or more motion capturing devices. In such an embodiment, the wearable computing device 104 may be configured to capture movement data points on behalf of the mobile computing device 102, such as in instances where the mobile computing device 102 may not have motion capture devices or may be unsuitable for use in performing gestures, such as if the mobile computing device 102 is a large tablet computer. In some instances, the wearable computing device 104 and mobile computing device 102 may be the same type of computing device, such as a smart watch. In other instances, the wearable computing device 104 and mobile computing device 102 may be different computing devices. For example, the wearable computing device 104 may be a smart watch and the mobile computing device 102 may be a smart phone.

In embodiments where the system 100 may include both a mobile computing device 102 and wearable computing device 104, the mobile computing device 102 and wearable computing device 104 may be configured to establish a communication channel for use in transmitting data signals to and from each device to the other. The communication channel may utilize any communication method suitable for use by the mobile computing device 102 and the wearable computing device 104, such as Bluetooth, near field communication, radio frequency, cellular communication, etc. In such embodiments, the mobile computing device 102 and wearable computing device 104 may establish a communication channel, the wearable computing device 104 may capture a plurality of movement data points based on the movement of motion capture devices included therein, and may electronically transmit a data signal to the mobile computing device 102 using the established communication channel that is superimposed or otherwise encoded with the movement data points.

The mobile computing device 102 and/or wearable computing device 104 may be configured to identify a gesture based on the captured plurality of movement data points. In embodiments where the system 100 may include the wearable computing device 104, the wearable computing device 104 may transmit the movement data points to the mobile computing device 102 for use in identifying the gesture, or the wearable computing device 104 may identify the gesture using the movement data points, and may transmit data associated with the gesture, such as an identification value, to the mobile computing device 102.

The gesture may be identified based on a correspondence between the captured plurality of movement data points, and movement data previously associated with the gesture. The previously associated movement data may be based on movement data points captured specifically for association with the gesture, for future identification of the gesture based on movement. For example, a consumer 106 using the mobile computing device 102 may choose to register a gesture via an application program executed by the mobile computing device 102. As part of the registration of the gesture, the consumer 106 may perform the gesture one or more times using the mobile computing device 102 or wearable computing device 104, as applicable. The mobile computing device 102 or wearable computing device 104 may capture the movement data points each time the consumer 106 is performing the gesture and may develop a set of movement data points associated with the gesture based thereon. For example, the mobile computing device 102 or wearable computing device 104 may average each movement vector captured via the motion capture devices for each time the gesture is performed, and may associate the combined movement of the averages with the gesture.

When the consumer 106 performs a gesture using the mobile computing device 102 or wearable computing device 104, the movement data points and corresponding movement vectors that are captured for the movement may be compared to those associated with each of the gestures registered by the consumer 106. The mobile computing device 104 or wearable computing device 104, as applicable, may then identify which registered gesture was performed by the consumer 106.

As part of the registration process, the consumer 106 may identify data to be conveyed when a specific gesture is performed. For instance, the consumer 106 may indicate that a specific gesture is to be associated with a set of payment credentials for the conveyance thereof. For example, the consumer 106 may register a gesture where the consumer 106 performs an overhand throwing motion using the wearable computing device 104 with the payment credentials for a specific transaction account, such that when the consumer 106 performs the overhand throwing motion while wearing the wearable computing device 104, the mobile computing device 102 electronically transmits the associated payment credentials to one or more external computing devices 108.

The external computing devices 108, illustrated in FIG. 1 as external computing devices 108a, 108b, and 108c may be computing devices suitable for the receipt of data being conveyed by the mobile computing device 102. External computing devices 108 may be any suitable type of computing device, such as a desktop computer, laptop computer, notebook computer, tablet computer, cellular phone, smart phone, smart watch, smart television, wearable computing device, implantable computing device, etc. In instances where the data being conveyed by the mobile computing device 102 may be payment credentials for use in a payment transaction, the external computing device 108 may be a point of sale device configured to initiate a payment transaction. In some instances, the point of sale device may be another mobile computing device 102. For example, a vendor at a sporting event may carry a tablet computer, which may be configured to receive the payment credentials from the mobile computing device 102 as transmitted once the associated gesture is performed by the consumer 106.

The mobile computing device 102 may be configured to establish a communication channel with one or more external computing devices 108 for use in the conveyance of data. The communication channel may utilize any suitable communication method, such as Bluetooth, radio frequency, near field communication, cellular communication, etc. In some instances, the communication channel established between the mobile computing device 102 and external computing device 108 may use the same communication method as used in the establishing communication channel between the mobile computing device 102 and wearable computing device 104. The mobile computing device 102 may be configured to electronically transmit a data signal to the external computing device 108 using the established communication channel that is superimposed or otherwise encoded with the data associated with the gesture performed by the consumer 106. For instance, the consumer 106 may perform their registered overhand throwing motion, and the mobile computing device 102 may electronically transmit the associated payment credentials to the external computing device 108.

In embodiments where the system 100 may include a plurality of different external computing devices 108, the mobile computing device 102 may be configured to identify an external computing device 108 to which to convey data. In some cases, the mobile computing device 102 may present the consumer 106 with a selection of external computing devices 108 detected by the mobile computing device 102. In some instances, the mobile computing device 102 may electronically transmit the data associated with the performed gesture to the nearest external computing device 108, which may be identified based on speed of communications using the established communication channel, geographic location data provided by each external computing device 108, or other suitable method.

In other instances, the mobile computing device 102 may select an external computing device 108 for receipt of the data based on the performed gesture. For example, the consumer 106 may perform the gesture in the direction of a specific external computing device 108. The mobile computing device 102 (e.g., or wearable computing device 104, as applicable) may identify a directional vector for the gesture that is based on the direction of the gesture as performed by the consumer 106. The mobile computing device 102 may then identify an external computing device 108 that is located at or near the same directional vector with respect to the mobile computing device 102. In an example, the consumer 106 may perform their registered overhand throwing motion in the direction of a specific vendor with a tablet computer that they are transacting with. The mobile computing device 102 may then transmit the payment credentials to that tablet computer, where the vendor may then initiate an electronic payment transaction using those payment credentials using traditional methods and systems for initiating a payment transaction.

In some embodiments, a gesture may be used as authentication with the mobile computing device 102. In such an embodiment, the consumer 106 may register a gesture with the mobile computing device 102 and may indicate that the gesture is to be used as authentication for the conveyance of data. In such instances, the consumer 106 may be required to perform the authentication gesture in addition to a gesture used to initiate the conveyance of data to an external computing device 108. In such an instance, the authentication gesture may be used to ensure that the user performing the gesture is authorized to convey the associated data, operating similar to a personal identification number or signature in traditional payment transactions.

Methods and systems discussed herein may enable a consumer 106 to perform a gesture using a mobile computing device 102 or wearable computing device 104 to initiate the conveyance of data from a mobile computing device 102 to an external computing device 108. Electronic transmissions of data from the mobile computing device 102 using an established communication channel may enable the consumer 106 to convey data, such as sensitive financial data, electronically with less of a risk of their data being compromised. In addition, the use of a gesture as a trigger for the conveyance of the data may provide for added security as to the transmission, as the data may not be transmitted accidentally due to an accidental button press, and the data may be protected in instances where the mobile computing device 102 is compromised.

For example, if the mobile computing device 102 is stolen, the thief may not be aware of the gesture registered for conveyance of payment credentials by the consumer 106, or the thief may be unable to perform the gesture with the same movement vectors registered by the consumer 106. For instance, the thief may have longer or shorter arms, which may cause a variance in the overhand throwing motion registered by the consumer 106 that may prevent the mobile computing device 102 as identifying the gesture performed by the thief as a valid, pre-registered gesture, which may provide additional security to the consumer 106. In instances where movement data is captured by a wearable computing device 104, a thief of the mobile computing device 102 may also be prevented from transmitting any data entirely without possession and use of the wearable computing device 104, which may provide an even higher level of security to the consumer 106, while still maintaining a high level of convenience.

Mobile Computing Device

Figure 2:
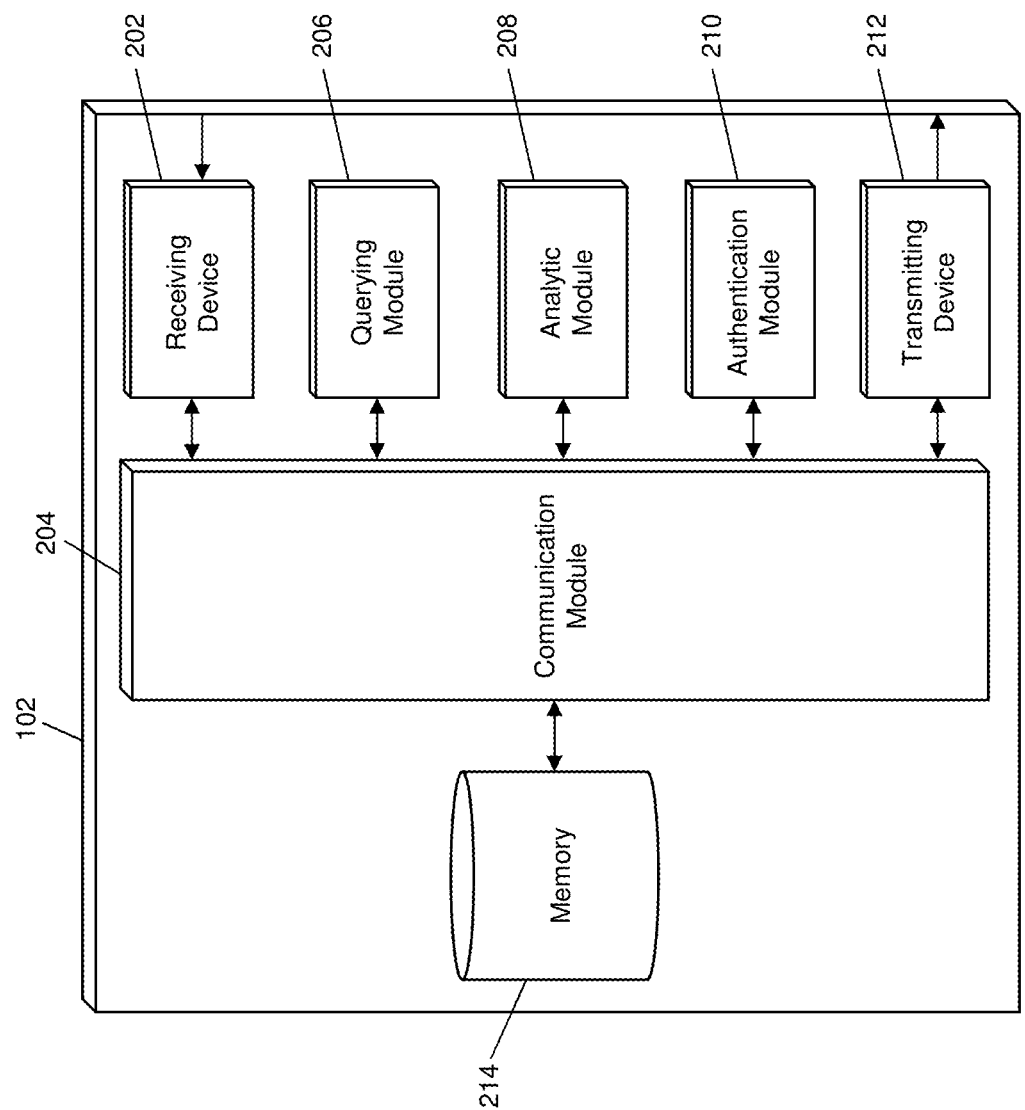
FIG. 2 is a block diagram illustrating the mobile computing device of FIG. 1 for the transmission of payment credentials based on a physical gesture in accordance with exemplary embodiments.

FIG. 2 illustrates an embodiment of the mobile computing device 102 of the system 100. It will be apparent to persons having skill in the relevant art that the embodiment of the mobile computing device 102 illustrated in FIG. 2 is provided as illustration only and may not be exhaustive to all possible configurations of the mobile computing device 102 suitable for performing the functions as discussed herein. For example, the computer system 800 illustrated in FIG. 8 and discussed in more detail below may be a suitable configuration of the mobile computing device 102.

The mobile computing device 102 may include a receiving device 202. The receiving device 202 may be configured to receive data over one or more networks and communication channels via one or more network protocols and communication methods. In some instances, the receiving device 202 may be configured to receive data from wearable computing devices 104 and external computing devices 108.

In some embodiments, the receiving device 202 may be comprised of multiple devices, such as different receiving devices for receiving data over different networks, such as a first receiving device for receiving data over Bluetooth and a second receiving device for receiving data via radio frequency. The receiving device 202 may receive data signals that are electronically transmitted, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by wearable computing devices 104 using communication channels established therewith, which may be superimposed otherwise encoded with movement data points and/or gesture identification data. Movement data points may correspond to movement of the wearable computing device 104 captured via one or more motion capture devices included therein or associated therewith. Gesture identification data may include an identification value associated with a gesture performed by the consumer 106 as identified by the wearable computing device 104 based on the captured movement data points for the performed gesture. The receiving device 202 may also be configured to receive data signals electronically transmitted by motion capture devices associated with the mobile computing device 102, which may be internal to or external from the mobile computing device 102. The receiving device 202 may also be configured to receive data from external computing devices 108 for use in the establishing of a communication channel therewith, such as identification data, security certificates, etc.

The mobile computing device 102 may also include a communication module 204. The communication module 204 may be configured to transmit data between modules, engines, databases, memories, and other components of the mobile computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the mobile computing device 102 and external components of the mobile computing device 102, such as externally connected databases, display devices, input devices, etc. The mobile computing device 102 may also include a processing device. The processing device may be configured to perform the functions of the mobile computing device 102 discussed herein as will be apparent to persons having skill in the relevant art. In some embodiments, the processing device may include and/or be comprised of a plurality of engines and/or modules specially configured to perform one or more functions of the processing device, such as a querying module 206, analytic module 208, authentication module 210, etc. As used herein, the term "module" may be software or hardware particularly programmed to receive an input, perform one or more processes using the input, and provide an output. The input, output, and processes performed by various modules will be apparent to one skilled in the art based upon the present disclosure.

The mobile computing device 102 may also include a memory 214. The memory 214 may be configured to store data for use by the mobile computing device 102 in performing the functions discussed herein. The memory 214 may be configured to store data using suitable data formatting methods and schema and may be any suitable type of memory, such as read-only memory, random access memory, etc. The memory 214 may include, for example, encryption keys and algorithms, communication protocols and standards, data formatting standards and protocols, program code for modules and application programs of the processing device, and other data that may be suitable for use by the mobile computing device 102 in the performance of the functions disclosed herein as will be apparent to persons having skill in the relevant art. In some embodiments, the memory 214 may be comprised of or may otherwise include a relational database that utilizes structured query language for the storage, identification, modifying, updating, accessing, etc. of structured data sets stored therein.

The memory 214 may be configured to store one or more gesture pairs. Each gesture pair may be a structured data set that includes data related to a physical gesture. The gesture pair may include an identification value associated with the related gesture and/or a plurality of movement data points associated with the gesture, such as may be captured by one or more motion capture devices during a registration process of the gesture. Each gesture pair may also include a data conveyance associated therewith. The data conveyance may include one or more data values or a package of data (e.g., a data file) that may be conveyed by the mobile computing device 102 upon performance of the associated gesture.

The mobile computing device 102 may include a querying module 206. The querying module 206 may be configured to execute queries on databases to identify information. The querying module 206 may receive one or more data values or query strings, and may execute a query string based thereon on an indicated database, such as the memory 214, to identify information stored therein. The querying module 206 may then output the identified information to an appropriate engine or module of the mobile computing device 102 as necessary. The querying module 206 may, for example, execute a query on the memory 214 to identify a performed gesture based on a correspondence between captured movement data points and the movement data points in a gesture pair. The querying module 206 may also be configured to execute a query on the memory 214 to identify a gesture pair based on an identification value, such as may be received from a wearable computing device 104 by the receiving device 202.

The mobile computing device 102 may also include an analytic module 208. The analytic module 208 may be configured analyze movement data points for the identification of data based thereon. The analytic module 208 may receive a plurality of movement data points and instructions as input, may perform analysis on the movement data points as instructed, and may output the result of the analysis to another module or engine of the mobile computing device 102. The analytic module 208 may be configured to, for example, analyze a plurality of movement data points for several repetitions of a gesture to identify an average set of movement data points and/or movement vectors for the gesture for registration. The analytic module 208 may also be configured to identify an external computing device 108 for transmission, such as by analysis of communication data and/or geographic data associated with each external computing device 108 to identify an external computing device 108 based on proximity to the mobile computing device 102 or based on direction as compared to a directional vector of a gesture performed by the consumer 106 as analyzed from the captured movement data points.

The mobile computing device 102 may also include an authentication module 210. The authentication module 210 may be configured to authenticate a user of the mobile computing device 102 (e.g., the consumer 106) using one or more gestures. The authentication module 210 may receive a plurality of movement data points or a gesture identification value, may authenticate the user based on the gesture, and may output a result of the authentication to another module or engine of the mobile computing device 102. For example, the authentication module 210 may receive a plurality of movement data points performed by the consumer 106 in addition to a gesture performed for data conveyance (e.g., before or after the identified gesture) and may identify if the movement data points correspond to an authentication gesture previously registered by the consumer 106 (e.g., and stored in the memory 214). The authentication module 210 may return a pass or fail result indicating if the authorization was successful or unsuccessful, where conveyance of the data may proceed accordingly.

The mobile computing device 102 may also include a transmitting device 212. The transmitting device 212 may be configured to transmit data over one or more networks and communication channels via one or more network protocols and communication methods. In some instances, the transmitting device 212 may be configured to transmit data to wearable computing devices 104 and external computing devices 108. In some embodiments, the transmitting device 212 may be comprised of multiple devices, such as different transmitting devices for transmitting data over different networks, such as a first transmitting device for transmitting data over Bluetooth and a second transmitting device for transmitting data via radio frequency. The transmitting device 212 may electronically transmit data signals that have data superimposed or otherwise encoded thereon that may be parsed by a receiving computing device. In some instances, the transmitting device 212 may include one or more modules for superimposing, encoding, or otherwise formatting data into data signals suitable for transmission.

The transmitting device 212 may be configured to electronically transmit data signals to external computing device 108 using an established communication channel that are superimposed or otherwise encoded with a data conveyance, such as may be stored in the memory 214 and identified via the querying module 206 based on performance of an associated gesture. The transmitting device 212 may also be configured to electronically transmit data signal to the external computing devices 108 and wearable computing devices 104 that may be superimposed or otherwise encoded with data suitable for use in establishing communication channels, such as identification data, protocol data, security certificates, etc. The transmitting device 212 may be configured to electronically transmit data signals to wearable computing devices 104 and motion capture devices that are superimposed or otherwise encoded with a request for movement data points or an identified gesture.

Wearable Computing Device

Figure 3:
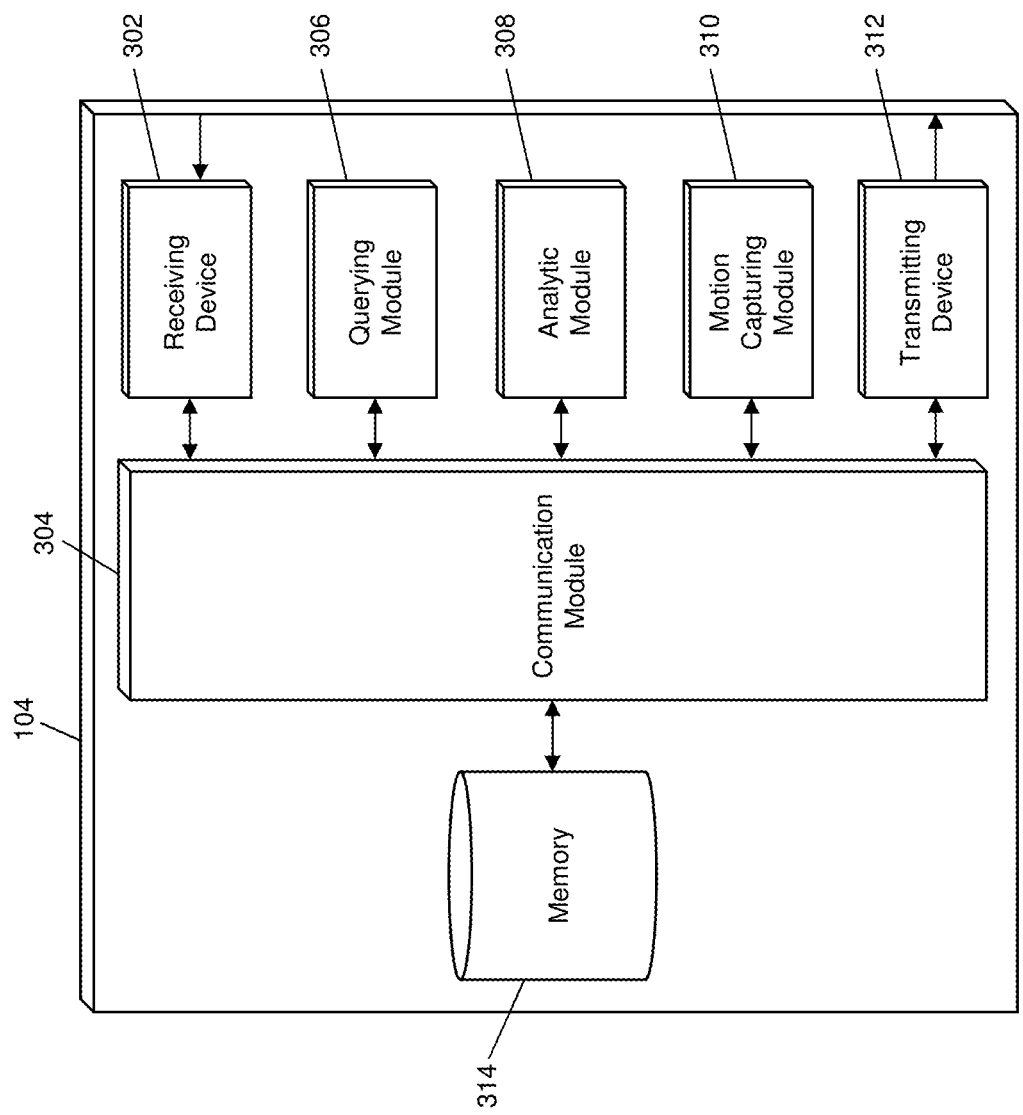
FIG. 3 is a block diagram illustrating the wearable computing device of FIG. 4 for the capturing of a physical gesture for use in conveying payment credentials in accordance with exemplary embodiments.

FIG. 3 illustrates an embodiment of the wearable computing device 104 of the system 100. It will be apparent to persons having skill in the relevant art that the embodiment of the wearable computing device 104 illustrated in FIG. 3 is provided as illustration only and may not be exhaustive to all possible configurations of the wearable computing device 104 suitable for performing the functions as discussed herein. For example, the computer system 800 illustrated in FIG. 8 and discussed in more detail below may be a suitable configuration of the wearable computing device 104.

The wearable computing device 104 may include a receiving device 302. The receiving device 302 may be configured to receive data over one or more networks and communication channels via one or more network protocols and communication methods. In some instances, the receiving device 302 may be configured to receive data from mobile computing devices 102 and motion capture devices. In some embodiments, the receiving device 302 may be comprised of multiple devices, such as different receiving devices for receiving data over different networks, such as a first receiving device for receiving data over Bluetooth and a second receiving device for receiving data via radio frequency. The receiving device 302 may receive data signals that are electronically transmitted, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by motion capture devices that are superimposed or otherwise encoded with movement data points associated with three-dimensional movement by a consumer 106. In some instances, the motion capture devices may be included in the wearable computing device 104 with communication using internal communication methods. In other instances, motion capture devices may be external to the wearable computing device 104 and received by the receiving device 302 via external communication methods. The receiving device 302 may also be configured to receive data signals electronically transmitted by the mobile computing device 102, such as may be superimposed or otherwise encoded with data requesting movement data points or gestures or for use in establishing a communication channel, such as identification data and security certificates.

The wearable computing device 104 may also include a communication module 304. The communication module 304 may be configured to transmit data between modules, engines, databases, memories, and other components of the wearable computing device 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the wearable computing device 104 and external components of the wearable computing device 104, such as externally connected databases, display devices, input devices, etc. The wearable computing device 104 may also include a processing device. The processing device may be configured to perform the functions of the wearable computing device 104 discussed herein as will be apparent to persons having skill in the relevant art.

In some embodiments, the processing device may include and/or be comprised of a plurality of engines and/or modules specially configured to perform one or more functions of the processing device, such as a querying module 306, analytic module 308, motion capturing module 310, etc. As used herein, the term "module" may be software or hardware particularly programmed to receive an input, perform one or more processes using the input, and provide an output. The input, output, and processes performed by various modules will be apparent to one skilled in the art based upon the present disclosure.

The wearable computing device 104 may also include a memory 314. The memory 314 may be configured to store data for use by the wearable computing device 104 in performing the functions discussed herein. The memory 314 may be configured to store data using suitable data formatting methods and schema and may be any suitable type of memory, such as read-only memory, random access memory, etc. The memory 314 may include, for example, encryption keys and algorithms, communication protocols and standards, data formatting standards and protocols, program code for modules and application programs of the processing device, and other data that may be suitable for use by the wearable computing device 104 in the performance of the functions disclosed herein as will be apparent to persons having skill in the relevant art. In some embodiments, the memory 314 may be comprised of or may otherwise include a relational database that utilizes structured query language for the storage, identification, modifying, updating, accessing, etc. of structured data sets stored therein.

The memory 314 may be configured to store one or more gesture pairs. Each gesture pair may be a structured data set that includes data related to a physical gesture. The gesture pair may include an identification value associated with the related gesture and a plurality of movement data points associated with the gesture, such as may be captured by one or more motion capture devices during a registration process of the gesture. The identification value may be a value unique to the related gesture suitable for use in the identification thereof, such as may be associated with a corresponding data conveyance in the mobile computing device 102. The plurality of movement data points may telegraph three-dimensional movement as may be performed by the consumer 106 during registration and repeated to initiate the conveyance of associated data.

The wearable computing device 104 may include a querying module 306. The querying module 306 may be configured to execute queries on databases to identify information. The querying module 306 may receive one or more data values or query strings, and may execute a query string based thereon on an indicated database, such as the memory 314, to identify information stored therein. The querying module 306 may then output the identified information to an appropriate engine or module of the wearable computing device 104 as necessary. The querying module 306 may, for example, execute a query on the memory 314 to identify a performed gesture based on a correspondence between captured movement data points and the movement data points in a gesture pair. The querying module 306 may also be configured to execute a query on the memory 314 to generate a new gesture pair during a registration process for a gesture being registered by the consumer 106.

The wearable computing device 104 may also include an analytic module 308. The analytic module 308 may be configured analyze movement data points for the identification of data based thereon. The analytic module 308 may receive a plurality of movement data points and instructions as input, may perform analysis on the movement data points as instructed, and may output the result of the analysis to another module or engine of the wearable computing device 104. The analytic module 308 may be configured to, for example, analyze a plurality of movement data points for several repetitions of a gesture to identify an average set of movement data points and/or movement vectors for the gesture for registration, and to analyze a plurality of movement data points to identify a gesture being performed based on a correspondence to a registered gesture as stored in the memory 314.

The wearable computing device 104 may also include a motion capturing module 310. The motion capturing module 310 may be configured to capture a plurality of movement data points via the use of one or more motion capture devices. The motion capturing module 310 may receive data signals from one or more motion capture devices and may analyze the data signals to generate a plurality of movement data points that telegraph movement of the wearable computing device 104. The motion capturing module 310 may output the captured plurality of movement data points to another module or engine of the wearable computing device 104 for use thereby. The motion capturing module 310 may be configured to capture any type of motion capable of being captured via motion capture devices, such as direction, velocity, rotation, etc., in one, two, or three dimensions.

The wearable computing device 104 may also include a transmitting device 312. The transmitting device 312 may be configured to transmit data over one or more networks and communication channels via one or more network protocols and communication methods. In some instances, the transmitting device 312 may be configured to transmit data to motion capture devices and mobile computing devices 102. In some embodiments, the transmitting device 312 may be comprised of multiple devices, such as different transmitting devices for transmitting data over different networks, such as a first transmitting device for transmitting data over Bluetooth and a second transmitting device for transmitting data via radio frequency. The transmitting device 312 may electronically transmit data signals that have data superimposed or otherwise encoded thereon that may be parsed by a receiving computing device. In some instances, the transmitting device 312 may include one or more modules for superimposing, encoding, or otherwise formatting data into data signals suitable for transmission.

The transmitting device 312 may be configured to electronically transmit data signals to mobile computing devices 102 that are superimposed or otherwise encoded with captured movement data points or the identification value of a gesture identified based thereon. The transmitting device 312 may also be configured to electronically transmit data signals to the motion capture devices and mobile computing devices 102 that may be superimposed or otherwise encoded with data suitable for use in establishing communication channels, such as identification data, protocol data, security certificates, etc. The transmitting device 312 may also be configured to electronically transmit data signals to motion capture devices that are superimposed or otherwise encoded with data requests requesting the capturing of movement.

Process for Gesture-Based Conveyance of Data

Figure 4:
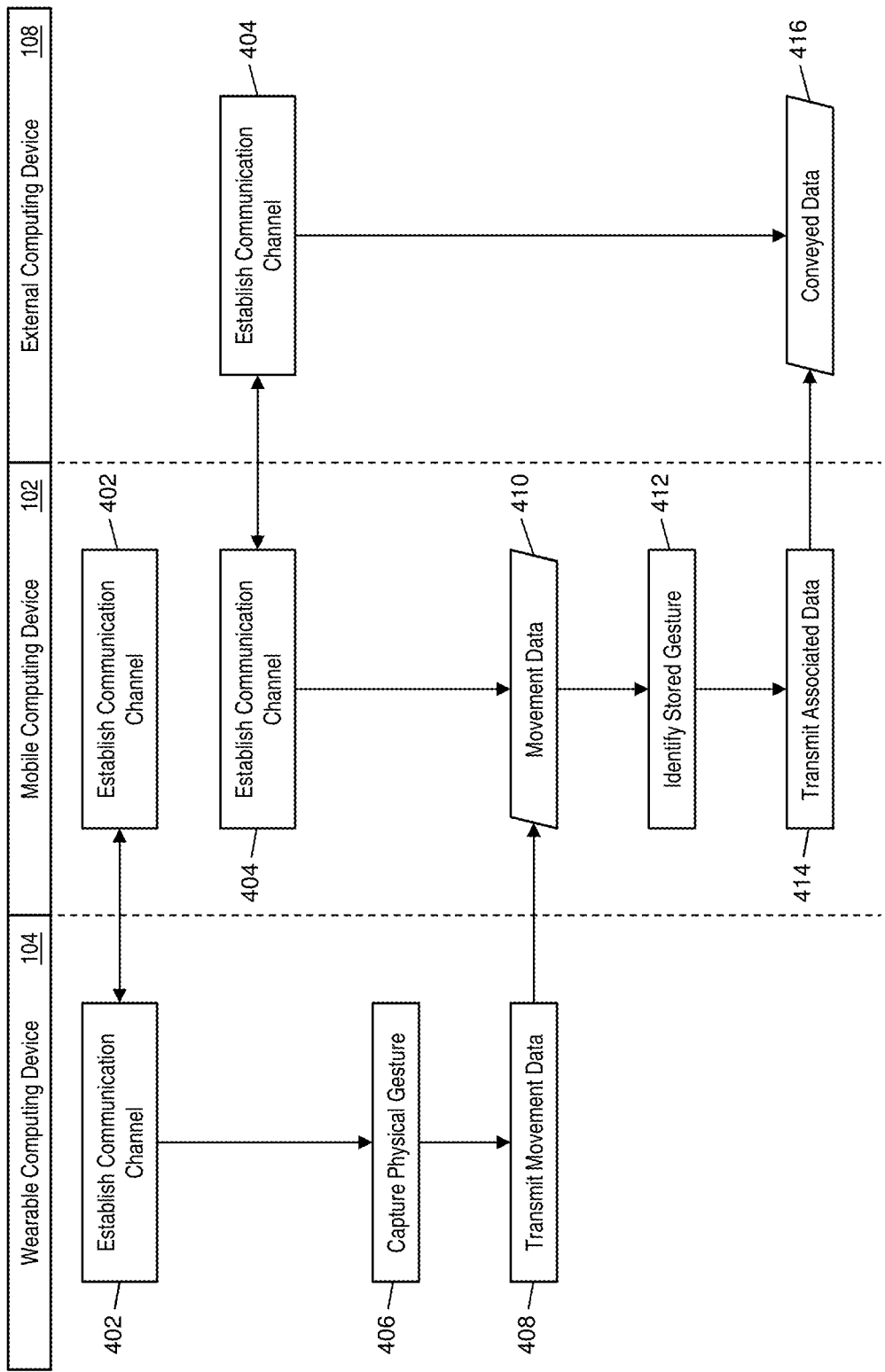
FIG. 4 is a flow diagram illustrating a process for conveying data from a mobile computing device using a physical gesture in accordance with exemplary embodiments.

FIG. 4 illustrates a process for the conveyance of data from a mobile computing device 102 based on the performance of a physical gesture associated therewith. While FIG. 4 illustrates the use of a wearable computing device 104 in addition to the mobile computing device 102 for the capturing of a physical gesture, it will be apparent to persons having skill in the relevant art that the functions performed by the wearable computing device 104 in the process illustrated in FIG. 4 may be performed by the mobile computing device 102, as discussed herein.

In step 402, the mobile computing device 102 and wearable computing device 104 may establish a communication channel. The communication channel may utilize any suitable communication method and protocol, such as Bluetooth, radio frequency, near field communication, cellular communication, etc. Establishing of the communication channel may include the exchange of security certificates or other data between the mobile computing device 102 and wearable computing device 104, such as may be performed via the receiving devices 202 and 302 and transmitting devices 212 and 312, respectively.

In step 404, the mobile computing device 102 and an external computing device 108 may establish a communication channel. The communication channel may utilize any suitable communication method and protocol, such as Bluetooth, radio frequency, near field communication, cellular communication, etc. In some instances, the communication channel established between the mobile computing device 102 and the external computing device 108 may utilize a different communication method than the communication channel established between the mobile computing device 102 and wearable computing device 104. Establishing of the communication channel may include the exchange of security certificates or other data between the mobile computing device 102 and external computing device 108, such as may be performed via the receiving device 202 and transmitting device 212 of the mobile computing device 102.

In step 406, the motion capturing module 310 of the wearable computing device 104 may capture a physical gesture as performed by the consumer 106 using the wearable computing device. The physical gesture may be captured as a plurality of movement data points that telegraph three-dimensional movement performed by the consumer 106 using one or more motion capture devices, which may be internal in or external to the wearable computing device 104. In step 408, the transmitting device 312 of the wearable computing device 104 may electronically transmit a data signal to the mobile computing device 102 using the established communication channel that is superimposed or otherwise encoded with the plurality of movement data points.

In step 410, the receiving device 202 of the mobile computing device 102 may receive and parse the data signal transmitted by the wearable computing device 104 to obtain the plurality of movement data points. In step 412, the querying module 206 of the mobile computing device 102 may execute a query on the memory 214 of the mobile computing device 102 to identify a gesture pair where the included movement data corresponds to the plurality of movement data points captured by the wearable computing device 104. In step 414, the transmitting device 212 of the mobile computing device 102 may electronically transmit a data signal to the external computing device 108 using the established communication channel that is superimposed or otherwise encoded with the data conveyance included in the identified gesture pair that is associated with the gesture performed by the consumer 106. In step 416, the external computing device 108 may receive the data conveyance, and may then perform one or more actions based thereon, such as the initiation of an electronic payment transaction.

Identification of an External Computing Device

Figure 5:
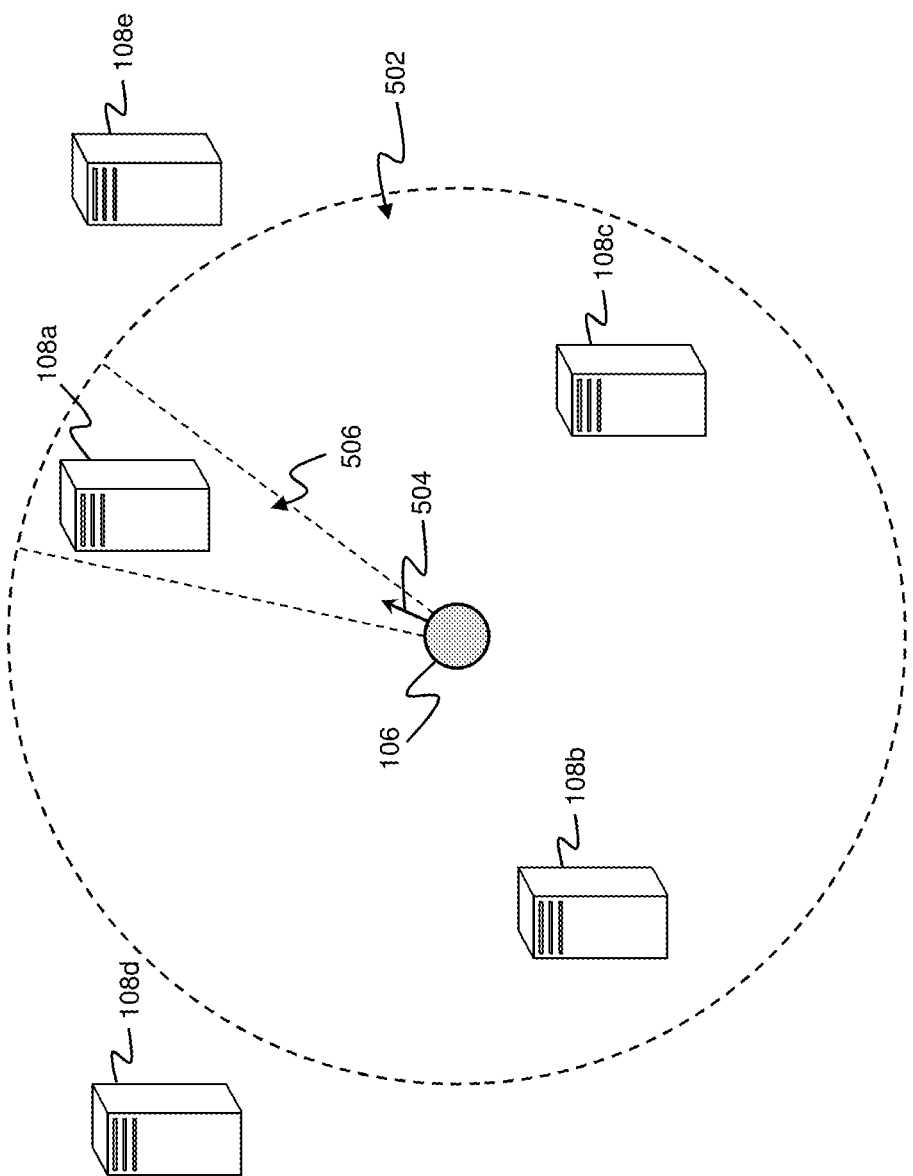
FIG. 5 is a diagram illustrating the identification of an external computing device based on a directional vector of a physical gesture in accordance with exemplary embodiments.

FIG. 5 illustrates the identification of an external computing device 108 by the mobile computing device 102 for the conveyance of data thereto based on the performance of a physical gesture by the consumer 106.

As illustrated in FIG. 5, the consumer 106 may be located near a plurality of different external computing devices 108 configured to receive data conveyances from mobile computing devices 102, illustrated as external computing devices 108*a*, 108*b*, 108*c*, 108*d*, and 108*e*. In the illustrated example, the communication distance of the mobile computing device 102 using the desired communication method (e.g., Bluetooth, near field communication, etc.) may be limited such that any external computing device 108 may be required to be within a predetermined area 502 surrounding the consumer 106, where the predetermined area 502 may be defined based on the communication distance. In some embodiments, the mobile computing device 102 may establish a communication channel with each external computing device 108 included in the predetermined area 502. In other embodiments, the mobile computing device 102 may only establish a communication channel with a selected recipient of the data conveyance.

In some embodiments, the mobile computing device 102 may select the external computing device 108 that is the closest to the consumer 106 in terms of physical distance. In such an embodiment, the mobile computing device 102 may determine which of the external computing devices 108*a*, 108*b*, and 108*c* that are within the predetermined area 502 may be the closest and may electronically transmit the data conveyance to the determined external computing device 108.

In other embodiments, the mobile computing device 102 may identify an external computing device 108 based on the gesture performed by the consumer 106. In such an embodiment, the wearable computing device 104 and/or the mobile computing device 102 may identify a directional vector 504 for the gesture performed by the consumer 106. In such embodiments, the directional vector 504 may be identified based on the plurality of movement data points captured for the consumer's physical movement. In some instances, the directional vector 504 for a gesture may be indicated, with respect to other movement of the gesture, during registration for use in identification of the directional vector 504 when the gesture is later performed.

Once the directional vector 504 is identified, the mobile computing device 102 may identify if any external computing devices 108 are within a directional area 506 that is within the predetermined area 502 and in an area indicated via the directional vector 504. In the example illustrated in FIG. 5, the external computing device 108*a* is located within the directional area 506. For instance, the consumer 106 may have performed their registered overhand throwing motion towards the external computing device 108*a*. In such an example, the mobile computing device 102 may electronically transmit a data signal superimposed or otherwise encoded with the associated data conveyance to the external computing device 108*a* using the established communication channel.

Figure 6:
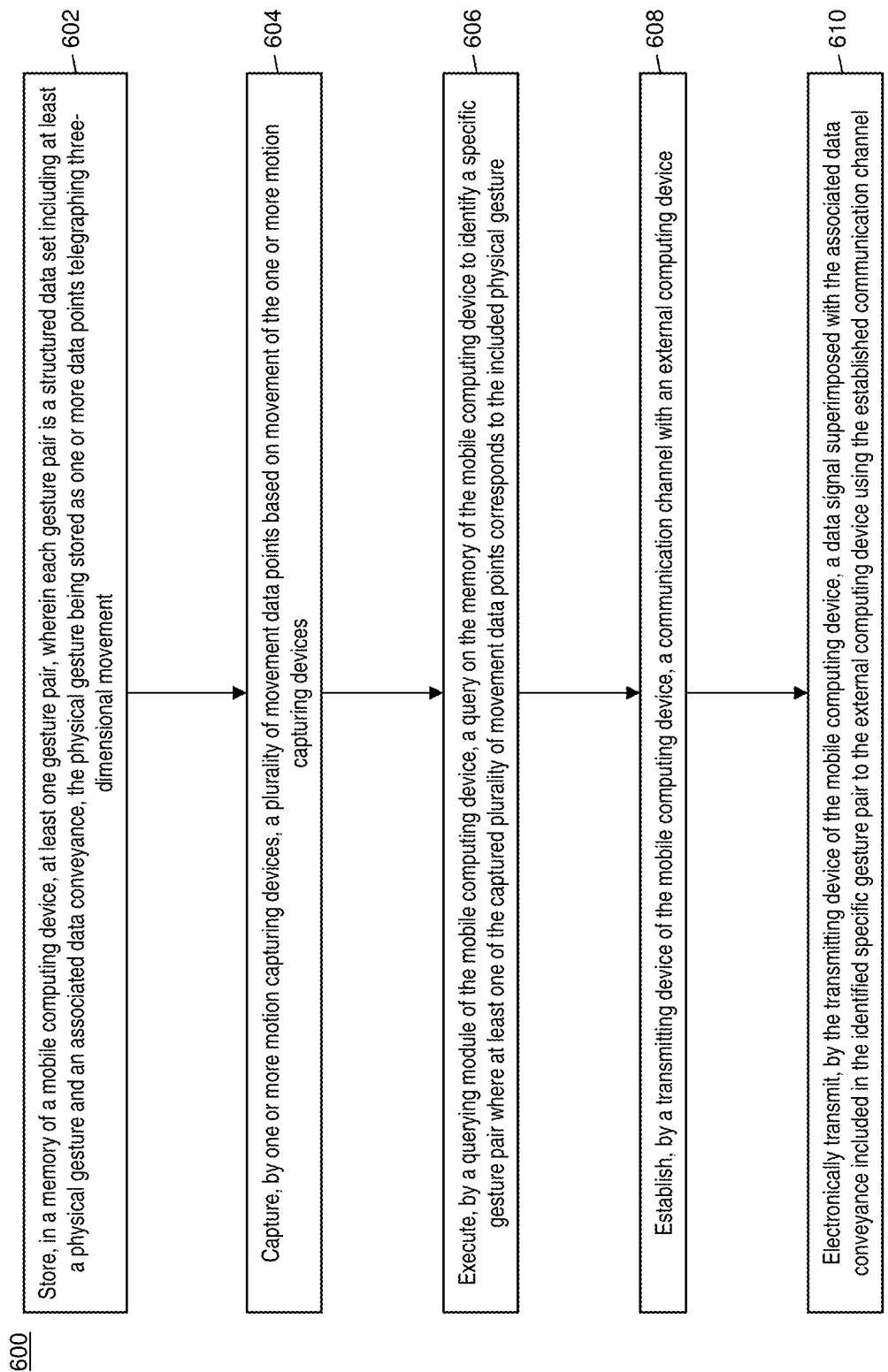
FIGS. 6 and 7 are flow charts illustrating exemplary methods for electronically transmitting data based on a physical gesture in accordance with exemplary embodiments.

First Exemplary Method for Electronically Transmitting Data Based on a Physical Gesture FIG. 6 illustrates a method 600 for the electronic transmission of a data conveyance identified based on the performance of a physical gesture using a mobile communication device.

In step 602, at least one gesture pair may be stored in a memory (e.g., the memory 214) of a mobile computing device (e.g., the mobile computing device 102), wherein each gesture pair is a structured data set including at least a physical gesture and an associated data conveyance, the physical gesture being stored as one or more data points telegraphing three-dimensional movement. In step 604, a plurality of movement data points may be captured by one or more capturing devices based on movement of the one or more capturing devices.

In step 606, a query may be executed on the memory of the mobile computing device by a querying module (e.g., the querying module 206) of the mobile computing device to identify a specific gesture pair where at least one of the captured plurality of movement data points corresponds to the included physical gesture. In step 608, a communication channel may be established with an external computing device (e.g., external computing device 108) by a transmitting device (e.g., the transmitting device 212) of the mobile computing device. In step 610, a data signal superimposed with the associated data conveyance included in the identified specific gesture pair may be electronically transmitted by the transmitting device of the mobile computing device to the external computing device using the established communication channel.

In one embodiment, the communication channel may be established prior to capturing the plurality of movement data points. In some embodiments, the data conveyance may include payment details associated with a transaction account, and the external computing device may be a point of sale device.

In one embodiment, the method 600 may also include: identifying, by a communication module (e.g., the communication module 204) of the mobile computing device, a plurality of additional computing devices and an associated physical location within a predetermined distance of the mobile computing device, wherein the physical location is referenced using at least a radial location with respect to the mobile computing device; identifying, by an analytic module (e.g., the analytic module 208) of the mobile computing device, a direction vector of the plurality of movement data points; and identifying, by the analytic module of the mobile computing device, the external computing device in the plurality of additional computing devices based on a correspondence between the identified direction vector and the radial location of the external computing device. In a further embodiment, the communication channel may be established subsequent to identification of the external computing device.

In some embodiments, the one or more motion capturing devices may be included in a wearable computing device (e.g., the wearable computing device 104) separate from the mobile computing device. In a further embodiment, the method 600 may further include: establishing, by a communication module (e.g., the communication module 204) of the mobile computing device, a second communication channel with the wearable computing device; and receiving, by a receiving device (e.g., the receiving device 202) of the mobile computing device, the captured plurality of movement data points from a transmitting device of the wearable computing device using the second communication channel.

Figure 7:
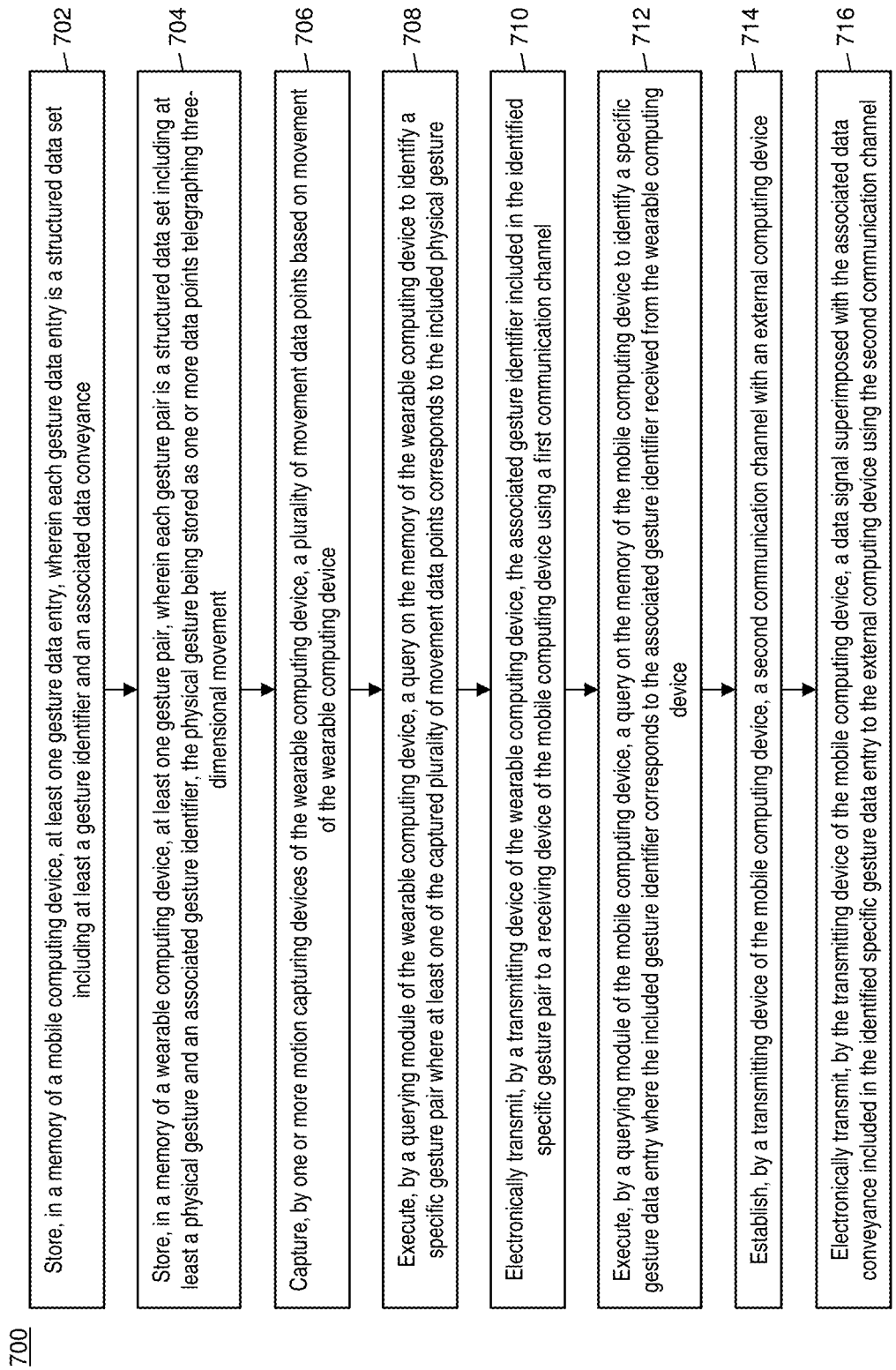

Second Exemplary Method for Electronically Transmitting Data Based on a Physical Gesture FIG. 7 illustrates a method 700 for the electronic transmission of a data conveyance identified using a mobile communication device based on the performance of a physical gesture captured via a wearable computing device.

In step 702, at least one gesture data entry may be stored in a memory (e.g., the memory 214) of a mobile computing device (e.g., the mobile computing device 102), wherein each gesture data entry is a structured data set including at least a gesture identifier and an associated data conveyance.

In step 704, at least one gesture pair may be stored in a memory (e.g., the memory 314) of a wearable computing device (e.g., the wearable computing device 104), wherein each gesture pair is a structured data set including at least a physical gesture and an associated gesture identifier, the physical gesture being stored as one or more data points telegraphing three-dimensional movement.

In step 706, a plurality of movement data points may be captured by one or more motion capturing devices of the wearable computing device based on movement of the wearable computing device. In step 708, a query may be executed on the memory (e.g., the memory 314) of the wearable computing device by a querying module (e.g., the querying module 306) of the wearable computing device to identify a specific gesture pair where at least one of the captured plurality of movement data points corresponds to the included physical gesture.

In step 710, the associated gesture identifier included in the identified specific gesture pair may be electronically transmitted by a transmitting device (e.g., the transmitting device 312) of the wearable computing device to a receiving device (e.g., the receiving device 202) of the mobile computing device using a first communication channel. In step 712, a query may be executed on the memory (e.g., the memory 214) of the mobile computing device by a querying module (e.g., the querying module 206) of the mobile computing device to identify a specific gesture data entry where the included gesture identifier corresponds to the associated gesture identifier received from the wearable computing device.

In step 714, a second communication channel may be established by a transmitting device (e.g., the transmitting device 212) of the mobile computing device with an external computing device (e.g., external computing device 108). In step 716, a data signal superimposed with the associated data conveyance included in the identified specific gesture data entry may be electronically transmitted by the transmitting device of the mobile computing device to the external computing device using the second communication channel.

In one embodiment, the method 700 may further include: identifying, by a communication module (e.g., the communication module 204) of the mobile computing device, a plurality of additional computing devices and an associated physical location within a predetermined distance of the mobile computing device, wherein the physical location is referenced using at least a radial location with respect to the mobile computing device; identifying, by an analytic module (e.g., the analytic module 308) of the wearable computing device, a direction vector of the plurality of movement data points, wherein the direction vector is electronically transmitted to the mobile computing device with the associated gesture identifier; and identifying, by an analytic module (e.g., the analytic module 208) of the mobile computing device, the external computing device in the plurality of additional computing devices based on a correspondence between the identified direction vector and the radial location of the external computing device. In some embodiments, the data conveyance may include payment details associated with a transaction account, and the external computing device may be a point of sale device.

Computer System Architecture

Figure 8:
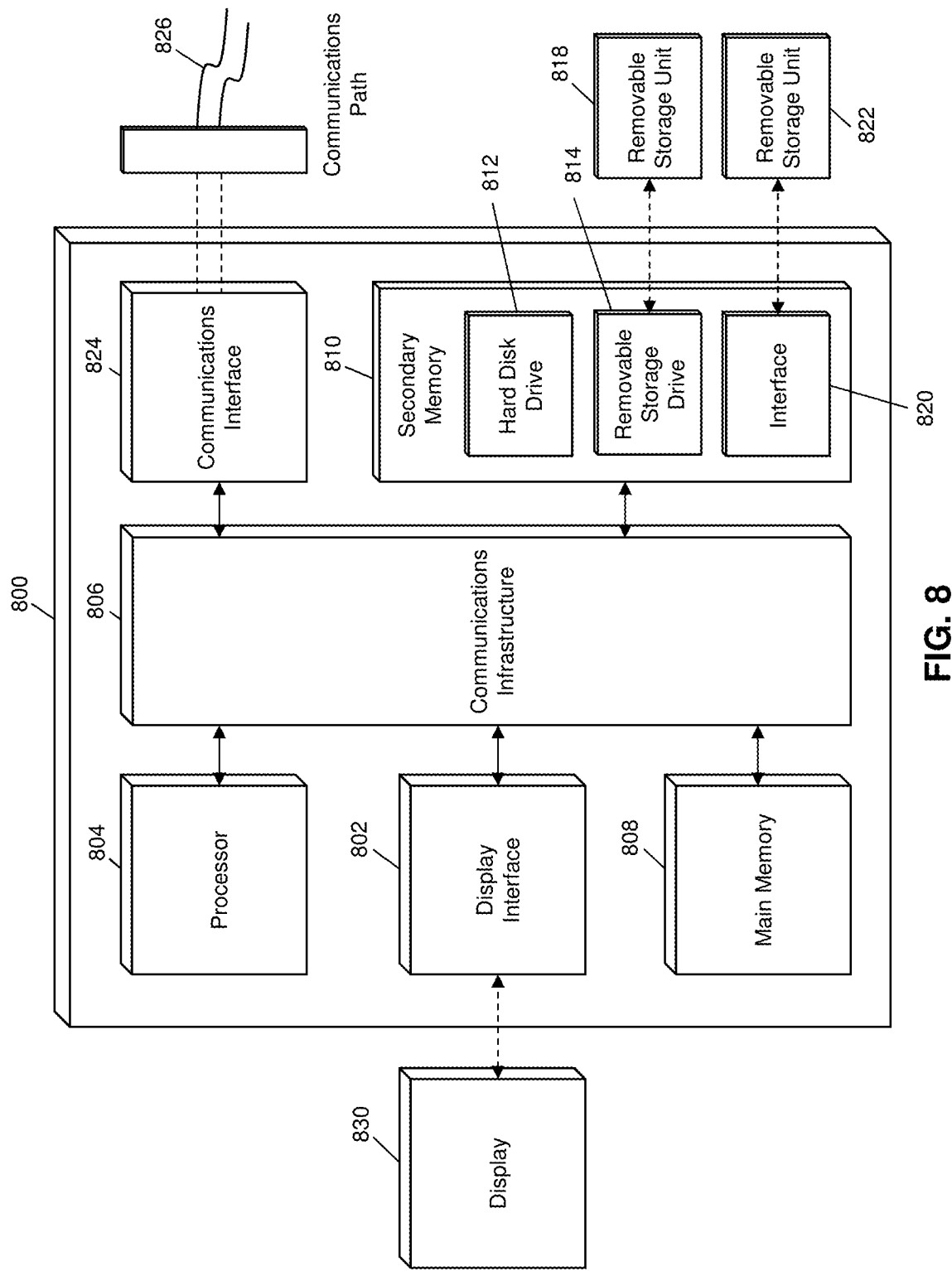
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the mobile computing device 102 and wearable computing device 104 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4, 6, and 7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4, 6, and 7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for electronically transmitting data based on a physical gesture. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for electronically transmitting data based on a physical gesture, comprising:
   storing, in a memory of a mobile computing device,
     (i) a plurality of gesture pairs, wherein each gesture pair is a structured data set including at least a physical gesture and specific data, associated with the physical gesture, for conveyance to another device, wherein the physical gesture is stored as one or more data points telegraphing three-dimensional movement, and
     (ii) an authentication gesture for authenticating a user, wherein the authentication gesture is associated with particular movement data points;
   measuring, by one or more motion capturing devices, three-dimensional movement and velocity of the one or more motion capturing devices;
   based on the measured movement and velocity, capturing, by the one or more motion capturing devices, a first plurality of movement data points associated with the measured three-dimensional movement and velocity based on (i) movement direction and the velocity of the one or more motion capturing devices on an x-axis, on a y-axis, and on a z-axis, and (ii) rotational direction and the velocity of the one or more motion capturing devices, wherein the first plurality of movement data points include measurement of movement, rotation and velocity suitable for the identification of a gesture;
   using the captured first plurality of movement data points associated with the measured three-dimensional movement and velocity, executing, by a querying module of the mobile computing device, a query on the memory of the mobile computing device and identifying a specific gesture pair, from the plurality of gesture pairs stored in the memory, based on a correspondence between the captured first plurality of movement data points and the one or more data points of the physical gesture included in the specific gesture pair;
   receiving, by an authentication module, of the mobile computing device, a second plurality of movement data points for authenticating the user;
   determining, by the authentication module, of mobile computing device, whether the user is authenticated based on a correspondence between the received second plurality of movement data points and the particular movement data points associated with the authentication gesture stored in the memory;
   based on movement direction of the one or more motion capturing devices, identifying, by the mobile computing device, at least one directional vector for the gesture that is based on the movement direction of the one or more motion capturing devices on an x-axis, on a y-axis, and on a z-axis;
   identifying, by the mobile computing device, an external computing device that is located at or near the directional vector with respect to the mobile computing device;
   establishing, by a transmitting device of the mobile computing device, a communication channel with the external computing device; and
   upon determining that the user is authenticated, electronically transmitting, by the transmitting device of the mobile computing device, a data signal superimposed with the specific data associated with the physical gesture included in the identified specific gesture pair to the external computing device using the established communication channel, wherein the specific data associated with the physical gesture includes transaction details for completing a transaction.

2. The method of claim 1, further comprising:
   identifying, by a communication module of the mobile computing device, a plurality of additional computing devices and an associated physical location within a predetermined distance of the mobile computing device, wherein the physical location is referenced using at least a radial location with respect to the mobile computing device; and
   identifying, by the analytic module of the mobile computing device, the external computing device in the plurality of additional computing devices based on a correspondence between the identified at least one direction vector and the radial location of the external computing device.

3. The method of claim 1, wherein
   the transaction details include payment credentials associated with a transaction account,
   the transaction is a payment transaction, and
   the external computing device is a point of sale device.

4. The method of claim 1, wherein the one or more motion capturing devices are included in a wearable computing device separate from the mobile computing device.

5. The method of claim 4, further comprising:
  establishing, by a communication module of the mobile computing device, a second communication channel with the wearable computing device; and
  receiving, by a receiving device of the mobile computing device, the captured first plurality of movement data points from a transmitting device of the wearable computing device using the second communication channel.

6. A method for electronically transmitting data based on a physical gesture, comprising:
  storing, in a memory of a mobile computing device,
    (i) a plurality of gesture data entries, wherein each gesture data entry is a structured data set including at least a gesture identifier and a specific data, associated with the gesture identifier, for conveyance to another device,
    (ii) an authentication gesture for authenticating a user, wherein the authentication gesture is associated with particular movement data points;
  storing, in a memory of a wearable computing device, a plurality of gesture pairs, wherein each gesture pair is a structured data set including at least a physical gesture and an associated gesture identifier, wherein the physical gesture is stored as one or more data points telegraphing three-dimensional movement;
  measuring, by one or more motion capturing devices of the wearable computing device, three-dimensional movement and velocity of the one or more motion capturing devices;
  based on the measured movement and velocity, capturing, by the one or more motion capturing devices of the wearable computing device, a first plurality of movement data points associated with the measured three-dimensional movement and velocity based on (i) movement direction and the velocity of the wearable computing device on an x-axis, on a y-axis, and on a z-axis, and (ii) rotational direction and the velocity of the one or more motion capturing devices, wherein the first plurality of movement data points include measurement of movement, rotation and velocity suitable for the identification of a gesture;
  using the captured first plurality of movement data points associated with the measured three-dimensional movement and velocity, executing, by a querying module of the wearable computing device, a query on the memory of the wearable computing device and identifying a specific gesture pair, from the plurality of gesture pairs stored in the memory of the wearable computing device, based on a correspondence between the captured first plurality of movement data points and the one or more data points of the physical gesture included in the specific gesture pair;
  electronically transmitting, by a transmitting device of the wearable computing device, the associated gesture identifier included in the identified specific gesture pair to a receiving device of the mobile computing device using a first communication channel;
  executing, by a querying module of the mobile computing device, a query on the memory of the mobile computing device to identify a specific gesture data entry where the gesture identifier included in the specific gesture data entry corresponds to the associated gesture identifier received from the wearable computing device;
  receiving, by an authentication module, of the mobile computing device, a second plurality of movement data points for authenticating the user;
  determining, by the authentication module, of mobile computing device, whether the user is authenticated based on a correspondence between the received second plurality of movement data points and the particular movement data points associated with the authentication gesture stored in the memory of the mobile computing device;
  based on the movement direction of the one or more motion capturing devices, identifying, by the mobile computing device, at least one directional vector for the gesture that is based on the movement direction of the one or more motion capturing devices on an x-axis, on a y-axis, and on a z-axis;
  identifying, by the mobile computing device, an external computing device that is located at or near the directional vector with respect to the mobile computing device;
  establishing, by a transmitting device of the mobile computing device, a second communication channel with the external computing device; and
  upon determining that the user is authenticated, electronically transmitting, by the transmitting device of the mobile computing device, a data signal superimposed with the specific data associated with the gesture identifier included in the identified specific gesture data entry to the external computing device using the second communication channel, wherein the specific data associated with the gesture identifier includes transaction details for completing a transaction.

7. The method of claim 6, further comprising:
  identifying, by a communication module of the mobile computing device, a plurality of additional computing devices and an associated physical location within a predetermined distance of the mobile computing device, wherein the physical location is referenced using at least a radial location with respect to the mobile computing device; and
  identifying, by an analytic module of the mobile computing device, the external computing device in the plurality of additional computing devices based on a correspondence between the identified at least one direction vector and the radial location of the external computing device.

8. The method of claim 6, wherein
  the transaction details include payment credentials associated with a transaction account,
  the transaction is a payment transaction, and
  the external computing device is a point of sale device.

9. A system for electronically transmitting data based on a physical gesture, comprising:
  a memory, of a mobile computing device, configured to store
    (i) a plurality of gesture pairs, wherein each gesture pair is a structured data set including at least a physical gesture and specific data, associated with the physical gesture, for conveyance to another device, wherein the physical gesture is stored as one or more data points telegraphing three-dimensional movement, (ii) an authentication gesture for authenticating a user, wherein the authentication gesture is associated with particular movement data points;
one or more motion capturing devices configured to
measure three-dimensional movement and velocity of the one or more motion capturing devices;
capture, based on the measured movement and velocity, a first plurality of movement data points associated with the measured three-dimensional movement and velocity based on (i) movement direction and the velocity of the one or more motion capturing devices on an x-axis, on a y-axis, and on a z-axis, and (ii) rotational direction and the velocity of the one or more motion capturing devices, wherein the first plurality of movement data points include measurement of movement, rotation and velocity suitable for the identification of a gesture;
a querying module, of the mobile computing device, configured to execute, using the captured first plurality of movement data points associated with the measured three-dimensional movement and velocity, a query on the memory of the mobile computing device and identify a specific gesture pair, from the plurality of gesture pairs stored in the memory, based on a correspondence between the captured first plurality of movement data points and the one or more data points of the physical gesture included in the specific gesture pair;
an authentication module, of the mobile computing device, configured to
receive a second plurality of movement data points for authenticating the user, and
authenticate the user based on a correspondence between the received second plurality of movement data points and the particular movement data points associated with the authentication gesture stored in the memory of the mobile computing device; and
a transmitting device, of the mobile computing device, wherein
the mobile computing device is configured to identify, based on movement direction of the one or more motion capturing devices, at least one directional vector for the gesture that is based on the movement direction of the one or more motion capturing devices on an x-axis, on a y-axis, and on a z-axis, and identify an external computing device that is located at or near the directional vector with respect to the mobile computing device, and
the transmitting device is configured to
establish a communication channel with the external computing device, and
upon determining that the user us authenticated, electronically transmit a data signal superimposed with the specific data associated with the physical gesture included in the identified specific gesture pair to the external computing device using the established communication channel, wherein the specific data associated with the physical gesture includes transaction details for completing a transaction.

10. The system of claim 9, further comprising:
a communication module of the mobile computing device configured to identify a plurality of additional computing devices and an associated physical location within a predetermined distance of the mobile computing device, wherein the physical location is referenced using at least a radial location with respect to the mobile computing device; and
an analytic module of the mobile computing device configured to identify the external computing device in the plurality of additional computing devices based on a correspondence between the identified at least one direction vector and the radial location of the external computing device.

11. The system of claim 9, wherein
the transaction details include payment credentials associated with a transaction account,
the transaction is a payment transaction, and
the external computing device is a point of sale device.

12. The system of claim 9, wherein the one or more motion capturing devices are included in a wearable computing device separate from the mobile computing device.

13. The system of claim 12, further comprising:
a communication module of the mobile computing device configured to establish a second communication channel with the wearable computing device; and
a receiving device of the mobile computing device configured to receive the captured first plurality of movement data points from a transmitting device of the wearable computing device using the second communication channel.

14. A system for electronically transmitting data based on a physical gesture, comprising:
a memory of a mobile computing device configured to store
(i) a plurality of gesture data entries, wherein each gesture data entry is a structured data set including at least a gesture identifier and a specific data, associated with the gesture identifier, for conveyance to another device,
(ii) an authentication gesture for authenticating a user, wherein the authentication gesture is associated with particular movement data points;
a memory of a wearable computing device configured to store a plurality of gesture pairs, wherein each gesture pair is a structured data set including at least a physical gesture and an associated gesture identifier, wherein the physical gesture is stored as one or more data points telegraphing three-dimensional movement;
one or more motion capturing devices, of the wearable computing device, configured to
measure three-dimensional movement and velocity of the one or more motion capturing devices, and
capture, based on the measured movement and velocity, a first plurality of movement data points associated with the measured three-dimensional movement and velocity based on (i) movement direction and the velocity of the wearable computing device on an x-axis, on a y-axis, and on a z-axis, and (ii) rotational direction and the velocity of the one or more motion capturing devices, wherein the first plurality of movement data points include measurement of movement, rotation and velocity suitable for the identification of a gesture;
a querying module, of the wearable computing device, configured to execute, using the captured first plurality of movement data points associated with the measured three-dimensional movement and velocity, a query on the memory of the wearable computing device and identify a specific gesture pair, from the plurality of gesture pairs stored in the memory, based on a correspondence between the captured first plurality of movement data points and the one or more data points of the physical gesture included in the specific gesture pair;

a transmitting device, of the wearable computing device, configured to electronically transmit the associated gesture identifier included in the identified specific gesture pair to a receiving device of the mobile computing device using a first communication channel;
a querying module, of the mobile computing device, configured to execute a query on the memory of the mobile computing device to identify a specific gesture data entry where the gesture identifier included in the specific gesture data entry corresponds to the associated gesture identifier received from the wearable computing device;
an authentication module, of the mobile computing device, configured to (i) receive a second plurality of movement data points for authenticating the user, and (ii) determine whether the user is authenticated based on a correspondence between the received second plurality of movement data points and the particular movement data points associated with the authentication gesture stored in the memory of the mobile computing device; and
a transmitting device, of the mobile computing device, wherein
the mobile computing device is configured to identify, based on the movement direction of the one or more motion capturing devices, at least one directional vector for the gesture that is based on the movement direction of the one or more motion capturing devices on an x-axis, on a y-axis, and on a z-axis, and identify an external computing device that is located at or near the directional vector with respect to the mobile computing device, and
the transmitting device, of the mobile computing device, is configured to
establish a second communication channel with the external computing device, and
electronically transmit, upon determining that the user is authenticated, a data signal superimposed with the specific data associated with the gesture identifier included in the identified specific gesture data entry to the external computing device using the second communication channel, wherein the specific data associated with the gesture identifier includes transaction details for completing a transaction.

15. The system of claim 14, further comprising:
a communication module of the mobile computing device configured to identify a plurality of additional computing devices and an associated physical location within a predetermined distance of the mobile computing device, wherein the physical location is referenced using at least a radial location with respect to the mobile computing device; and
an analytic module of the mobile computing device configured to identify the external computing device in the plurality of additional computing devices based on a correspondence between the identified at least one direction vector and the radial location of the external computing device.

16. The system of claim 14, wherein
the transaction details include payment credentials associated with a transaction account,
the transaction is a payment transaction, and
the external computing device is a point of sale device.

* * * * *